United States Patent
Burrowes et al.

(10) Patent No.: US 10,929,114 B2
(45) Date of Patent: Feb. 23, 2021

(54) STATIC ASSET CONTAINERS

(71) Applicant: Box, Inc., Redwood City, CA (US)

(72) Inventors: David John Burrowes, Redwood City, CA (US); David Jordan, Cupertino, CA (US)

(73) Assignee: Box, Inc., Redwood City, CA (US)

( * ) Notice: Subject to any disclaimer, the term of this patent is extended or adjusted under 35 U.S.C. 154(b) by 13 days.

(21) Appl. No.: 16/048,237

(22) Filed: Jul. 28, 2018

(65) Prior Publication Data
US 2020/0034127 A1 Jan. 30, 2020

(51) Int. Cl.
*G06F 9/445* (2018.01)
*G06F 8/60* (2018.01)
*G06F 11/34* (2006.01)
*G06F 16/955* (2019.01)
*G06F 16/958* (2019.01)

(52) U.S. Cl.
CPC ............ *G06F 8/60* (2013.01); *G06F 11/3466* (2013.01); *G06F 16/955* (2019.01); *G06F 16/958* (2019.01)

(58) Field of Classification Search
CPC ........ G06F 8/60; G06F 16/955; G06F 16/958; G06F 11/3466
USPC ...................................................... 717/177
See application file for complete search history.

(56) References Cited

U.S. PATENT DOCUMENTS

| | | | | |
|---|---|---|---|---|
| 7,836,094 B2 * | 11/2010 | Ornstein | ............... | G06F 17/211 707/803 |
| 8,918,448 B2 * | 12/2014 | DeLuca | ................. | G06F 8/61 709/200 |
| 8,997,081 B1 * | 3/2015 | Manion | ..................... | G06F 8/65 717/168 |
| 9,509,745 B2 * | 11/2016 | Gangadharan | ........ | H04L 67/141 |
| 9,639,381 B2 * | 5/2017 | O'Neill | ............... | G06F 9/44521 |
| 9,641,529 B2 * | 5/2017 | Kovacs | ............... | G06F 21/6281 |
| 9,772,831 B2 * | 9/2017 | Lucovsky | ................ | G06F 8/60 |
| 10,176,106 B2 * | 1/2019 | Aronovich | .......... | G06F 12/0888 |

(Continued)

OTHER PUBLICATIONS

"Build a container for your static JavaScript application"; Jelmer Snoeck—Manifold: Apr. 15, 2018. https://www.manifold.co/blog/building-a-production-grade-container-for-your-static-javascript-application-b2b2eff83fbd.*

(Continued)

*Primary Examiner* — Francisco J Aponte
(74) *Attorney, Agent, or Firm* — Vista IP Law Group, LLP

(57) ABSTRACT

Systems for managing static assets of web applications. A method embodiment includes identifying a web application that comprises a code base and a set of static assets, then separating the code base of the web application from the set of static assets that are referenced by the web application. The code base is deployed as application services whereas the static assets are deployed as static asset containers. Specifically, the set of static assets referenced by the application services are deployed in containers that are instantiated separately from where the application services are instantiated. Requests to access the application services and requests to access the static assets are tracked by taking performance measurements of the systems that process the accesses. Dynamic scaling of static asset containers is done independently from dynamic scaling of the application services. The dynamic scaling is based on combinations of measured usage and/or any system performance characteristics.

20 Claims, 8 Drawing Sheets

(56) References Cited

U.S. PATENT DOCUMENTS

| | | | |
|---|---|---|---|
| 10,380,081 B2* | 8/2019 | Brady | G06Q 10/1095 |
| 2009/0019386 A1* | 1/2009 | Sweetland | G06F 17/248 |
| | | | 715/765 |
| 2009/0049422 A1* | 2/2009 | Hage | G06F 8/10 |
| | | | 717/104 |
| 2012/0005166 A1* | 1/2012 | Pace | G06F 8/60 |
| | | | 707/654 |
| 2014/0006347 A1* | 1/2014 | Qureshi | H04L 9/0822 |
| | | | 707/621 |
| 2016/0179767 A1* | 6/2016 | Mavinakuli | H04L 47/803 |
| | | | 715/760 |
| 2017/0154017 A1* | 6/2017 | Kristiansson | G06F 16/957 |
| 2018/0020062 A1* | 1/2018 | Li | H04W 4/70 |
| 2018/0032347 A1* | 2/2018 | Haupt | G06F 9/4488 |
| 2018/0247064 A1* | 8/2018 | Aronovich | G06F 21/6209 |
| 2018/0288129 A1* | 10/2018 | Joshi | H04L 43/08 |
| 2018/0359146 A1* | 12/2018 | Bevemyr | H04L 41/085 |
| 2019/0220529 A1* | 7/2019 | Eberlein | G06F 8/60 |
| 2019/0235897 A1* | 8/2019 | Goel | G06F 8/61 |
| 2020/0092332 A1* | 3/2020 | Bhattathiri | H04L 63/107 |

OTHER PUBLICATIONS

Aptible—"How do I serve static assets when using Aptible Deploy?", 2019—https://www.aptible.com/documentation/faq/deploy/static-assets.html.*

Nick Chase, "Introduction to YAML: Creating a Kubernetes deployment", Open Cloud Digest, Jan. 11, 2017.

* cited by examiner

STATIC ASSET CONTAINERS

FIELD

This disclosure relates to computing systems, and more particularly to techniques for forming and managing static asset containers.

BACKGROUND

Many modern computing systems involve web-based applications or "web apps" that are accessed and run on demand by various users. Such web applications are often hosted at a computing system that is accessible over the Internet such that the users can access the web app from any location and from any user device. In many cases, the web apps rely on a code base of executable code (e.g., using C#, PHP, Java, etc.), which in turn relies on a collection of static assets (e.g., images, cascading style sheets, icons, etc.) that together provide the capability the users expect from the web app. For web apps having a modest code base size and deployment scope, the effort to manage the static assets associated with the web app are likewise modest.

However, for web apps or collections of web apps that have larger code bases and/or deployment scopes (e.g., many users), many challenges pertaining to managing the corresponding static assets can arise. For example, even though a particular web app from a collection of related web apps might use only a small portion of a set of static assets, the entire set of static assets for the collection of web apps might be instantiated to support the one particular web app. Such instantiation of unutilized static assets can occur over various web apps in the collection of web apps, and/or over many instantiations of each particular web app, thus needlessly consuming storage resources and other computing resources. Still worse, certain web apps might need to be deployed on many servers to support the network traffic demands of many concurrent users, whereas their underlying static assets might not need to be deployed on so many servers when there is a relatively smaller amount of computing resources demanded for accessing the static assets. Further, as more developers collaborate on the development of a particular web app or collection web apps, "ownership" of the management of the static assets becomes increasingly nebulous.

What is needed is a way to manage the code base of a web app differently than the management of the static assets of the web app.

SUMMARY

The present disclosure describes techniques used in systems, methods, and in computer program products for managing static asset containers, which techniques advance the relevant technologies to address technological issues with legacy approaches. More specifically, the present disclosure describes techniques used in systems, methods, and in computer program products for deploying static asset services as executable containers. Certain embodiments are directed to technological solutions for deploying static assets of web applications as static asset containers that are exposed as static asset services.

The disclosed embodiments modify and improve over legacy approaches. In particular, the herein-disclosed techniques provide technical solutions that address the technical problems attendant to managing the static assets associated with large web applications. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. In particular, practice of the herein-disclosed improvements drastically reduces both storage demands and network traffic by individually-sizing code and static assets rather than deploying code and static assets in a one-size-fits-all approach as is prevalent in earlier deployments.

Furthermore, some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of high performance web computing as well as advances in various technical fields related to data distribution.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
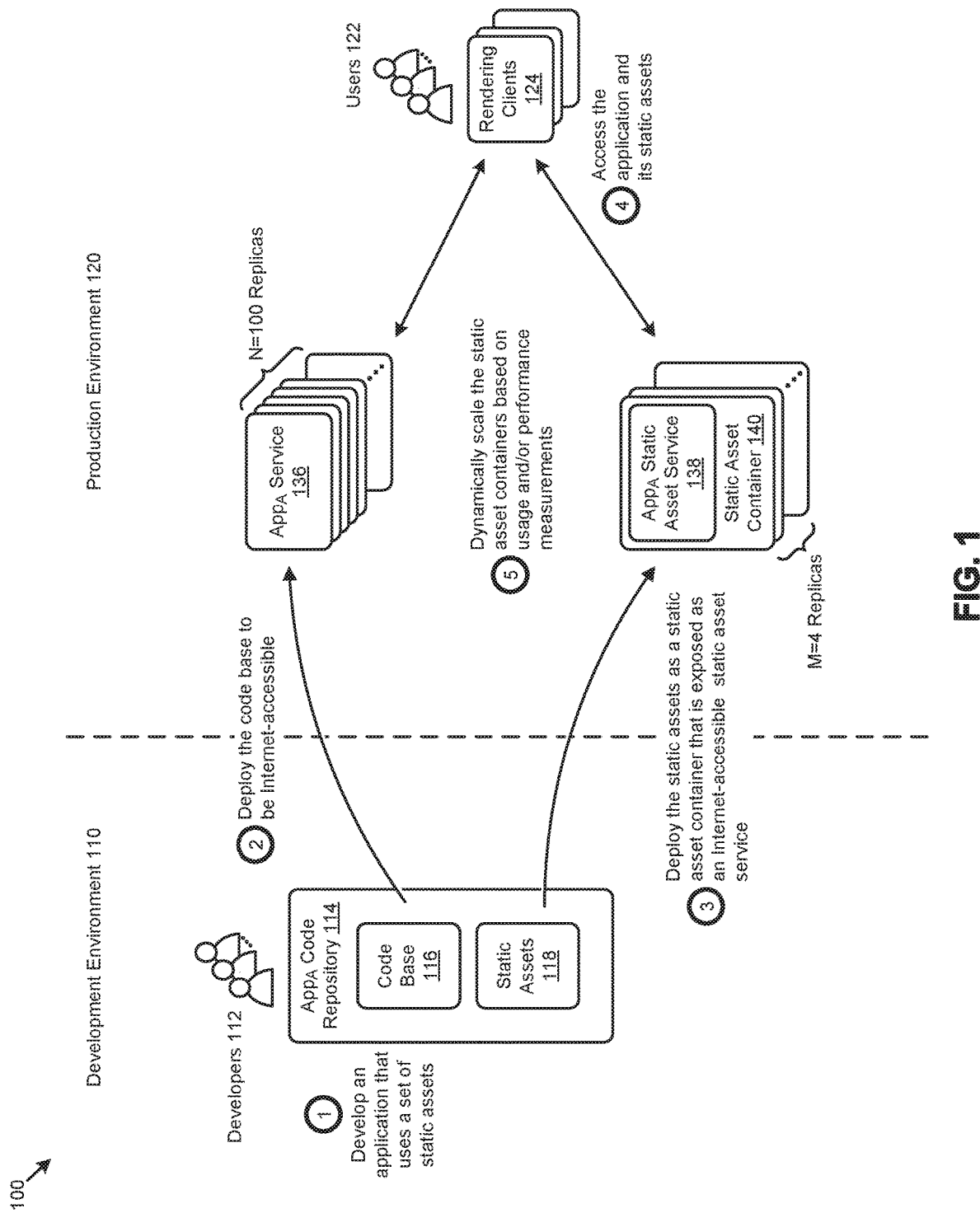
FIG. 1 illustrates a computing environment in which embodiments of the present disclosure can be implemented.

Embodiments in accordance with the present disclosure address the problem of managing the static assets associated with respective web applications. Some embodiments are directed to approaches for deploying static assets of a web application as static asset containers that are exposed as static asset services. The accompanying figures and discussions herein present example environments, systems, methods, and computer program products for deploying static asset services as executable containers.

Overview

Disclosed herein are techniques for deploying the static assets of web applications as static asset containers that are exposed as a static asset services. As such, the static assets of the web application can be managed separately from the code base of the web application. As an example, the quantity and physical location of the instantiations of the static assets can be determined separately from the quantity and physical location of the instantiations of the code base. In certain embodiments, the code base is deployed as an application service, and the set of static assets associated with the code base is deployed as a static asset container, which is exposed as a static asset service. A mechanism is implemented to associate the static asset service with the application service, thereby facilitating calls from the application service to its associated static asset service. The scaling (e.g., instantiation quantity, location, etc.) of the static asset container is managed based at least in part on certain performance measurements (e.g., measurements of access latency, a network traffic metric, etc.). In certain embodiments, the static asset service and application service are associated by a URL or a portion of a URL. In certain embodiments, access to the static asset service and/or static asset container is monitored.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates one aspect pertaining to deploying static assets of a web application as static asset containers that are exposed as a static asset service. The figure is presented to illustrate how such static asset containers are deployed and accessed in a computing environment. Specifically, FIG. 1 depicts a development environment 110 that comprises a plurality of developers 112 that are collaborating to develop a web application "$App_A$" that uses a certain set of static assets (operation 1). As such, developers 112 access an $App_A$ code repository 114 (e.g., GitHub repository) to develop the application. The $App_A$ code repository 114 comprises a code base 116 of dynamic runnable and/or functional code, and a set of static assets 118 that are referenced by the code base 116. These two types of entities are separated, as shown, so they can be deployed separately (e.g., using separate sets of resources, using separate deployment techniques, etc.).

Specifically, once the code base of the web application has been separated from the set of static assets that are referenced by the web application, the code base 116 is deployed to a production environment 120 at an Internet-accessible location (operation 2). In this scenario, and as shown, deploying the code base as an Internet-accessible application service facilitates access to the functionality and/or capabilities provided by the code base using web technologies and/or protocols (e.g., HTTP). As shown, a certain number of replicas (e.g., N=100) of an $App_A$ service 136 might be deployed to achieve certain performance expectations of a set of users 122 of the web application. As used herein, a web app or web application is a collection of executable code, a first portion of which code runs on a user device and a second portion of which code runs on a different computer that is accessible over the Internet. A web app or web application may have any number of associated computer-readable objects that are not executable code but nevertheless are accessed during execution of the web application. Also, and as used herein, static assets are computer-readable objects that are referenced by one or more corresponding web applications.

Strictly as one example of a web application and its use of corresponding static assets, during execution of a web application, the web application executes code to display an image (e.g., logo, user interface display item, etc.), which image is a computer-readable object contained a set of static assets. As such, web applications and their associated static assets can be managed separately. For example, a web application can be deployed using a first set of computing equipment and techniques, while the static assets that are associated with the web application can be deployed using a second set of computing equipment and techniques.

Specifically, in this embodiment, and using the herein disclosed techniques, the static assets 118 are deployed to the production environment 120 as a static asset container 140 that is exposed as an $App_A$ static asset service 138 (operation 3). A static asset container is an executable container that can be instantiated (e.g., replicated) and run in a variety of disparate computing environments. A static asset container exposed as a static asset service specifically facilitates instantiation of any number of replicas over a variety of computing environments, with any of such replicas being accessed as an Internet-accessible service (e.g., using HTTP requests). As an example, the set of users 122 in production environment 120 can access instances (e.g., replicas) of the $App_A$ service and the $App_A$ static asset service via HTTP requests from a respective set of rendering clients 124 such as browsers (operation 4).

As can be observed, the number of replicas (e.g., M=4) of the static asset container 140 can differ from the number of replicas (e.g., N=100) of the $App_A$ service 136. The respective number of replicas can be established upon initial deployment of the web application based at least in part on expected usage (e.g., number of service requests) by users 122. By deploying the static assets as static asset containers, the scaling of the static asset containers for the $App_A$ static asset service 138 can be dynamically scaled separately from the scaling of the $App_A$ service 136 based on the then-current usage and/or performance measurements (operation 5).

As facilitated by the techniques disclosed herein, this approach provides technical solutions that result in computer functionality improvements. More specifically, such techniques serve to reduce the demand for computer memory, reduce the demand for computer processing power, reduce network bandwidth use, and reduce the demand for inter-component communication. As an example, applying the herein disclosed techniques facilitates deploying merely the static assets used by $App_A$ in the respective static asset containers, thereby eliminating the use of storage resources to store unutilized static assets as in other approaches. Furthermore, as earlier described, the scaling of the static asset containers can be performed independently of other components of the web application (e.g., the $App_A$ service 136), which independent scaling facilitates a more efficient use of the computing resources used to support access to the static assets.

One embodiment of techniques for static asset container deployment as facilitated by the techniques described herein is disclosed in further detail as follows.

Figure 2:
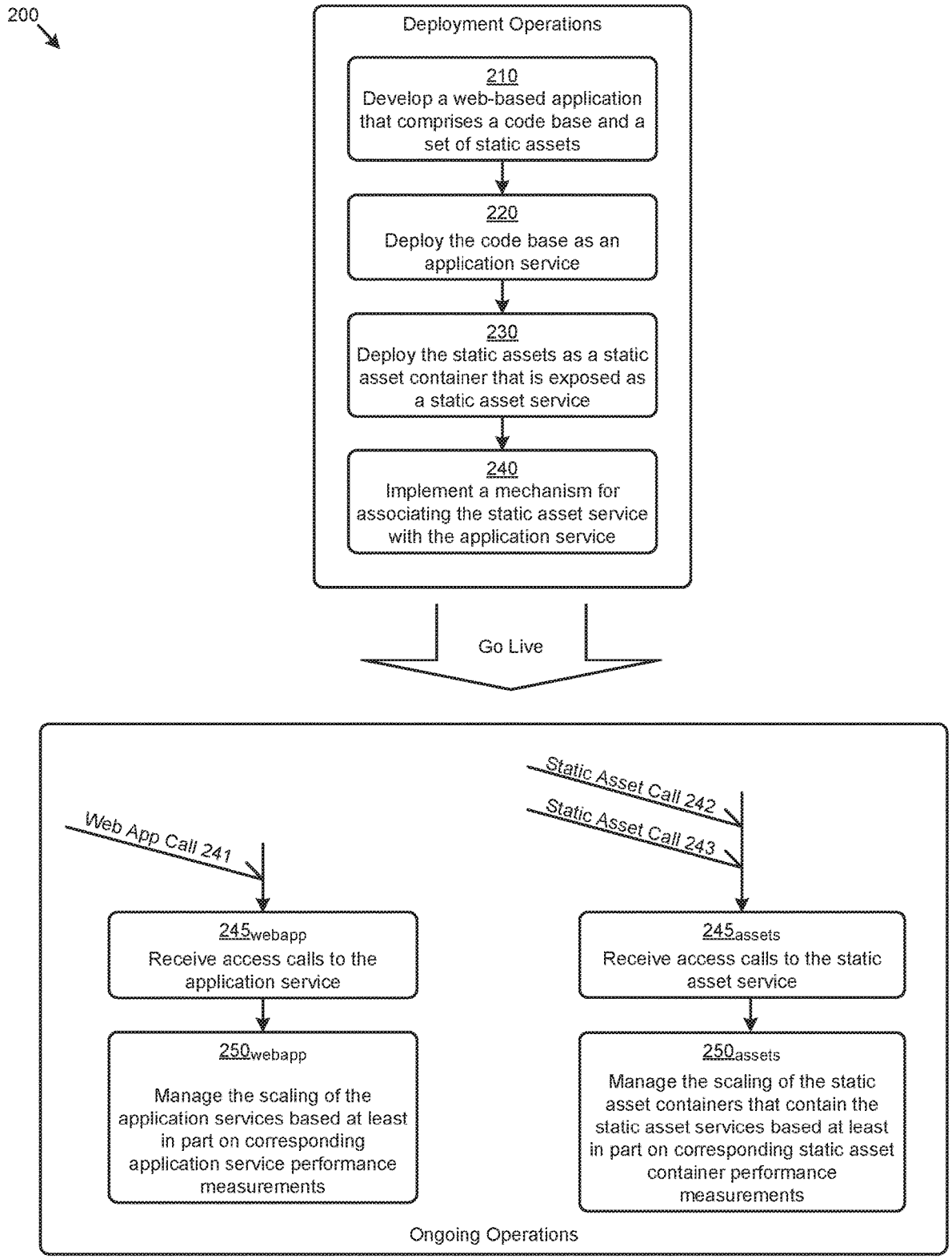
FIG. 2 depicts a static asset container deployment technique as implemented in systems that facilitate deploying static asset services as executable containers, according to an embodiment.

FIG. 2 depicts a static asset container deployment technique 200 as implemented in systems that facilitate deploying static asset services as executable containers. As an option, one or more variations of static asset container deployment technique 200 or any aspect thereof may be implemented in the context of the architecture and functionality of the embodiments described herein. The static asset container deployment technique 200 or any aspect thereof may be implemented in any environment.

The static asset container deployment technique 200 presents one embodiment of certain steps and/or operations that facilitate deploying static assets of a web application as static asset containers that are exposed as a static asset service. The static asset container deployment technique 200 can commence by developing a web-based application (e.g., web app) that comprises a code base and a set of static assets (step 210). As an example, the code base might comprise a set of dynamic functional code (e.g., based on C#, PHP, Java, etc.) and the static assets might comprise a collection of content objects (e.g., images, icons, cascading style sheets, JavaScript, etc.) that together provide the capability that users expect from a web app.

According to the technique of FIG. 2, a set of deployment operations are carried out. Specifically, the code base is deployed (e.g., to a production environment) as an application service (step 220). In some cases, the application is deployed to a hosting service (e.g., Microsoft Azure, Google Cloud, Amazon AWS, etc.). The static assets of the web app are then deployed as a static asset container that is exposed as a static asset service (step 230). In some cases, the static asset service is hosted by a content delivery network.

Since the static asset service is deployed separately from the application service, a mechanism for associating the static asset service with the application service is implemented (step 240). Strictly as examples, application code might reference static assets by a published name, or, the application code might use an encoded URL to reference a proxy or content delivery network address that is routed to the requested static asset.

In this embodiment, and as shown, once the static assets and the application service are deployed, the system can "Go Live" and the shown set of ongoing operations can commence.

The application service and the static asset service can be accessed from a browser or other application in the user device to provide the full capability of the web app or application to the user. More specifically the browser code or any other code can access the web app via the application service (step $245_{webapp}$). This is shown in FIG. 2 by the web app call 241 to access the application service. Also, directly or indirectly (e.g., by the browser code or by the web app code, or by any other code), the static assets can be accessed via the static asset service (step $245_{assets}$). An example of a direct access is shown in FIG. 2 by the static asset call 242 to access the static asset service. An example of an indirect call (e.g., from a component of the application service) is shown as static asset call 243 to access the static asset service.

Performance measurements pertaining to the calls and/or performance aspects or behaviors of the underlying system that receives the calls can influence replications. Deploying the static asset containers separately from the application code according to the herein disclosed techniques facilitates scaling of the static assets separately from scaling of the applications. Specifically, the scaling (e.g., number or replicas or instantiations) of application services is managed (by step $250_{webapp}$) based at least in part on a first set of performance measurements. Independently, the scaling (e.g., number or replicas or instantiations) of a static asset container that contains the static asset service is managed (by step $250_{assets}$) based at least in part on a second set of performance measurements.

One embodiment of a system for implementing the static asset container deployment technique 200 and/or other herein disclosed techniques is disclosed as follows.

Figure 3:
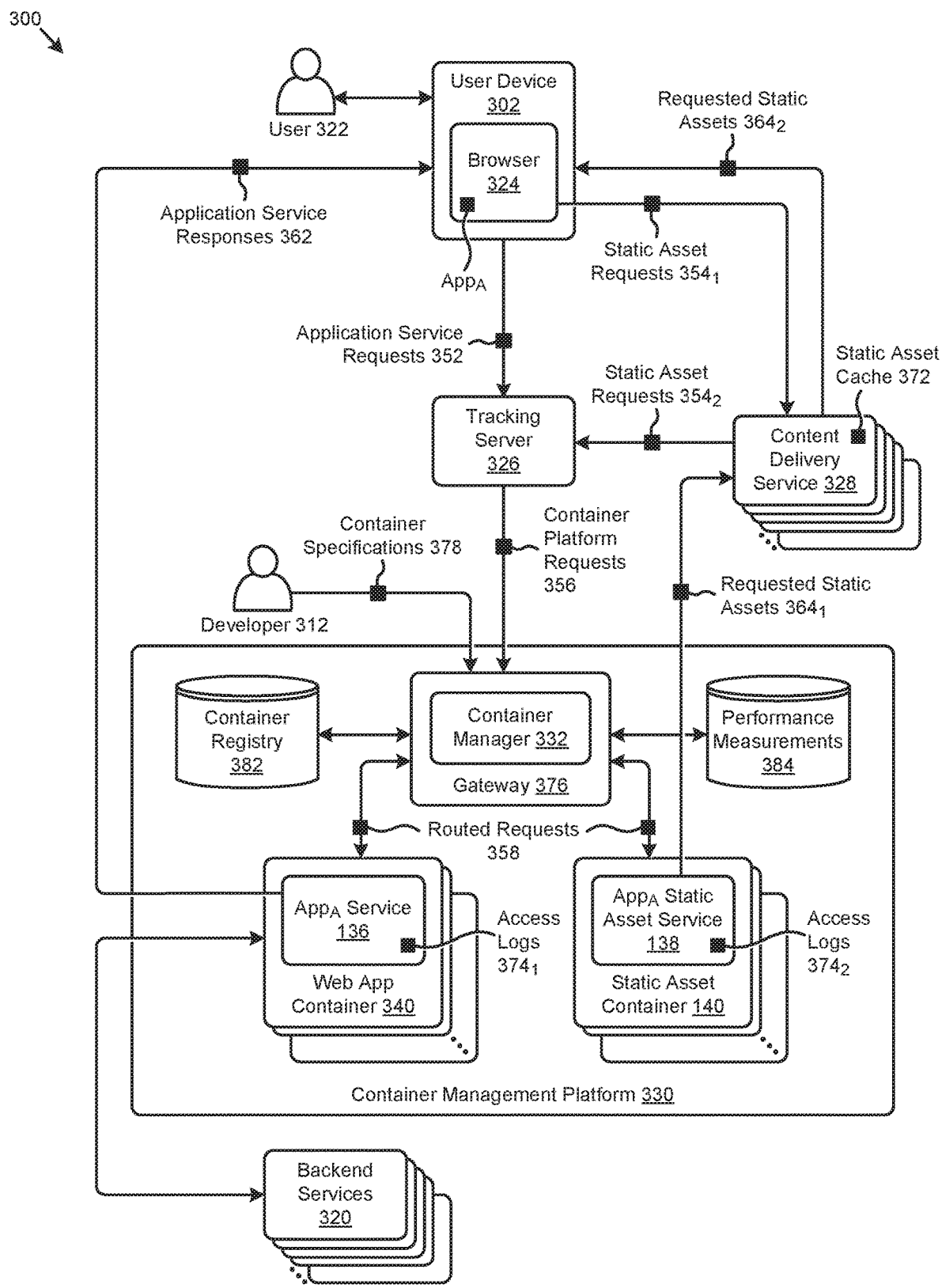
FIG. 3 depicts a computing system for deploying static asset services as executable containers, according to an embodiment.

FIG. 3 depicts a computing system 300 for deploying static asset services as executable containers. As an option, one or more variations of computing system 300 or any aspect thereof may be implemented in the context of the architecture and functionality of the embodiments described herein. The computing system 300 or any aspect thereof may be implemented in any environment.

FIG. 3 illustrates one aspect pertaining to deploying static assets of a web application as static asset containers that are exposed as a static asset service. Specifically, the figure is presented to show one embodiment of the components and associated data flows that facilitate managing the static assets associated with large web applications. The components and data flows shown in FIG. 3 present one partitioning and associated data manipulation approach. The specific example shown is purely exemplary, and other subsystems, data structures, and/or partitioning are reasonable.

As shown, the computing system 300 depicts a user 322 that desires to run application $App_A$ from a browser 324 of a user device 302. The static assets of the $App_A$ application are deployed as a certain number of replicas of a static asset container 140 that are each exposed as an $App_A$ static asset service 138 in accordance with the herein disclosed techniques. As shown, the code base of the $App_A$ application is deployed as a certain number of replicas of a web app container 340 that are each exposed as an $App_A$ service 136. The static asset containers and the web app containers are deployed to a container management platform 330 (e.g., using Kubernetes-style containers or pods).

To facilitate deployment of the containers to the container management platform 330, a developer 312 might provide a set of container specifications 378 to a container manager 332 at the platform. The container manager 332 will store the container specifications 378 and/or other information in a container registry 382 to facilitate access to (e.g., request routing, etc.) and/or management of (e.g., availability, scaling, etc.) of the containers that are hosted at the container management platform 330.

An example of a portion of the container specifications that might be associated with the $App_A$ static asset container is presented in Table 1. The information shown in Table 1 is structured in a manner that closely resembles YAML, but other structures and/or formats for codifying such container specifications are possible (e.g., XML, JSON, etc.). As can be observed, the "appA-static-assets" (line 04) container specifications shown in Table 1 indicate two replicas (line 07) are to be deployed with each being allocated 100 millicores of CPU resources (line 13) and 200 MB of storage resources (line 14). The container manager 332 will, among other tasks, ensure that the specified quantity of, and resources allocated to, the container replicas are maintained.

TABLE 1

Selected $App_A$ static asset container specifications

| Line | Specification |
|---|---|
| 01 | apiVersion: apps/v2beta1 |
| 02 | kind: Deployment |
| 03 | metadata: |
| 04 |   name: appA-static-assets |
| 05 |   namespace: appA-static-assets-dev |
| 06 | spec: |
| 07 |   replicas: 2 |
| 08 |   template: |
| 09 |     spec: |
| 10 |       containers: |
| 11 |         resources: |
| 12 |           limits: |
| 13 |             cpu: 100millicores |
| 14 |             memory: 200MB |
| 15 |         volumes: |
| 16 |           name: access-log |

The container manager 332 may also access a set of performance measurements 384 to perform certain container management functions. For example, the container manager 332 may adjust the number of replicas based at least in part on the performance measurements 384. In some cases, the performance measurements 384 may derive from performance data collected at the containers, such as data from a set of access logs $374_1$ collected by $App_A$ service 136 at web app container 340, or data from a set of access logs $374_2$ collected by $App_A$ static asset service 138 at static asset container 140. Techniques for using performance measurements to manage containers are disclosed in further detail as pertains to FIG. 5.

Continuing with the discussion of FIG. 3, when various instances of application service requests 352 are issued from browser 324, they are received at a tracking server 326. Such tracking servers (e.g., Apache Traffic Server) might be implemented to track the browsing sessions of various users of a particular application and/or accesses to any Internet-accessible services or assets. The tracking server 326 can be configured so as to forward the application service requests 352 as container platform requests 356 to the container management platform 330. A gateway 376 at the container manager 332 routes the received requests (e.g., routed requests 358) based at least in part on, for example, certain container and/or service identification information stored in the container registry 382. One or more instances of the $App_A$ service will receive the application service requests 352 from the gateway 376 and return a corresponding set of application service responses 362 to the browser 324. In some cases, the $App_A$ service might access one or more backend services 320 to produce the application service responses 362.

In conjunction with or separate from the application service requests 352, various instances of static asset requests $354_1$ are also issued from browser 324. As shown, such requests might be received at a content delivery service 328 (e.g., at one or more servers of the content delivery network). If the particular static asset requested is in a static asset cache 372 accessible by the content delivery service 328, the static asset is returned to the browser 324. If the requested static asset or assets are not available locally, the content delivery service 328 forwards the static asset requests (e.g., static asset requests $354_2$) to tracking server 326. The tracking server 326 is configured to resolve and/or translate addresses and to route the static asset requests $354_2$ as container platform requests 356 to the container management platform 330 (e.g., using a resolved or translated address).

The gateway 376 routes the received requests (e.g., routed requests 358) to one or more instances of the $App_A$ static asset service 138. The $App_A$ static asset service will receive the static asset requests from the gateway 376 and return a corresponding set of requested static assets $364_1$ to the content delivery service 328, which in turn delivers the requested static assets $364_2$ to the browser 324. In some cases, the content delivery service 328 will store some or all of the requested static assets $364_1$ in the static asset cache 372.

The foregoing discussions include techniques for associating static asset services with application services to facilitate ongoing access measurements and dynamic deployment of the services, which techniques are disclosed in further detail as follows.

Figure 4:
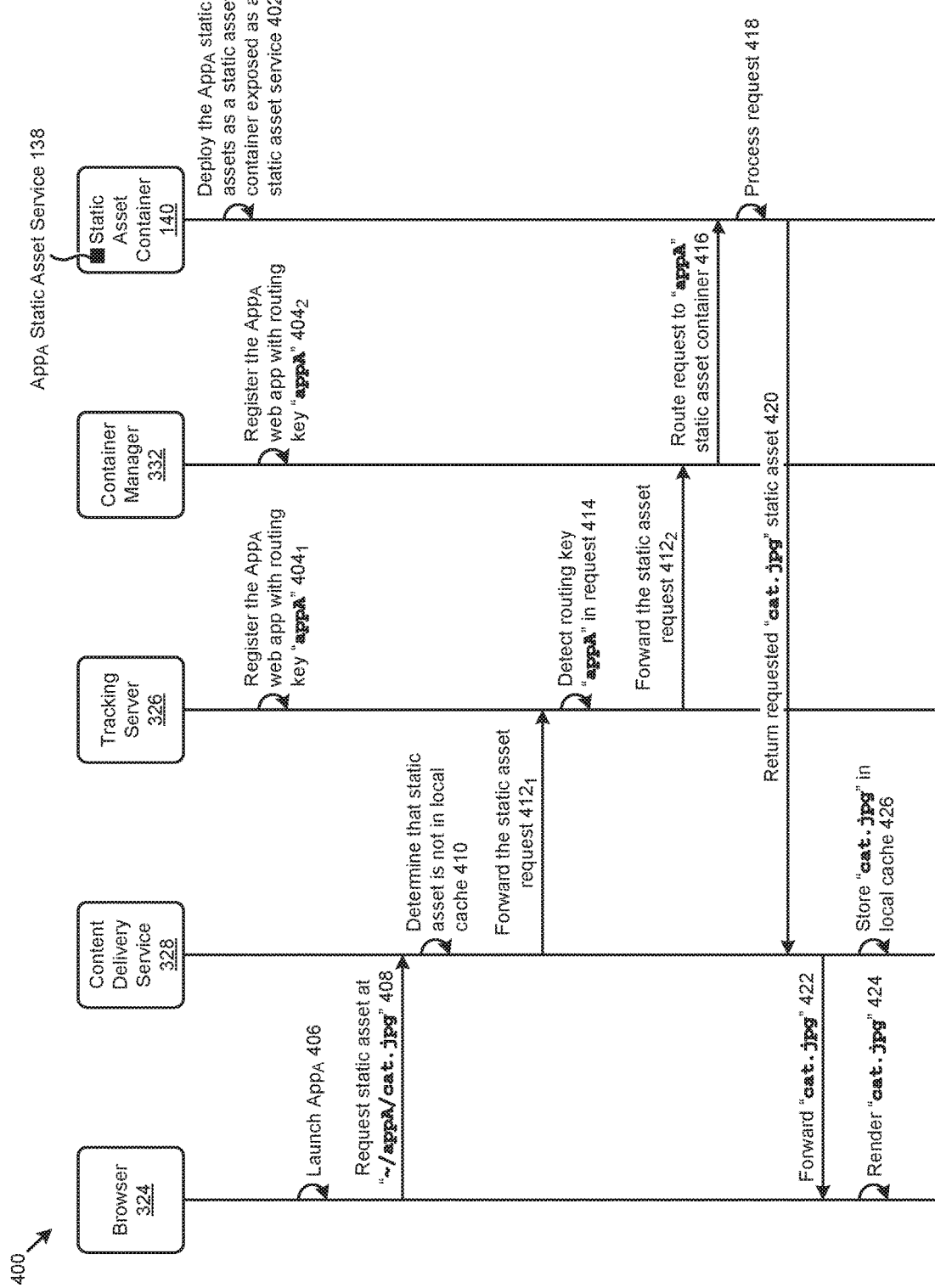
FIG. 4 presents a static asset container access technique as implemented in systems that facilitate deploying static asset services as executable containers, according to an embodiment.

FIG. 4 presents a static asset container access technique 400 as implemented in systems that facilitate deploying static asset services as executable containers. As an option, one or more variations of static asset container access technique 400 or any aspect thereof may be implemented in the context of the architecture and functionality of the embodiments described herein. The static asset container access technique 400 or any aspect thereof may be implemented in any environment.

FIG. 4 illustrates one aspect pertaining to deploying static assets of a web application as static asset containers that are exposed as a static asset service. Specifically, the figure is being presented with respect to its contribution to implementing a mechanism for associating the static asset service with the web application to facilitate high performance access to the static assets.

The static asset container access technique 400 shown in FIG. 4 depicts various computing system components earlier described that can exhibit a set of high order interactions (e.g., operations, messages, etc.) to facilitate such static asset service associations and static asset accesses. Specifically shown are the browser 324, the content delivery service 328, the tracking server 326, the container manager 332, and the static asset container 140 exposed as $App_A$ static asset service 138.

The static asset container access technique 400 commences after a particular web application has been selected for deployment and the set of static assets used by the particular web application have been determined.

The particular web application (denoted as $App_A$) is deployed. The static asset container 140 is configured to host the static assets and provide access to the static assets. The static assets are exposed as a static asset service (operation 402). The $App_A$ application is registered at the tracking server 326 and the container manager 332 with a routing key of "appA" (operation $404_1$ and operation $404_2$, respectively). For example, the routing key might be established during development of the $App_A$ application and incorporated in the $App_A$ code base so as to facilitate routing of requests to the $App_A$ static asset service 138 as disclosed in more detail as follows.

At some moment in time following a launch of $App_A$ at browser 324 (operation 406), a request for a static asset at "~/appA/cat.jpg" is issued to the content delivery service 328 (message 408). The content delivery service 328 determines that the requested static asset is not stored in a local cache (operation 410) and forwards the static asset request to the tracking server 326 (message $412_1$). The tracking server 326 detects the routing key "appA" in the received request (operation 414) and accordingly forwards the static asset request to container manager 332 (message $412_2$). For example, the earlier performed registration of $App_A$ at tracking server 326 provided information that indicated requests containing "appA" are to be forwarded to container manager 332. Furthermore, the registration of $App_A$ at container manager 332 facilitates the routing of the received request to the "appA" static asset container (e.g., static asset container 140) (message 416).

The request is processed by the $App_A$ static asset service 138 at the static asset container 140 (operation 418) and the requested static asset (e.g., "cat.jpg") is returned to content delivery service 328 (message 420). The content delivery service 328 then forwards the static asset to browser 324 (message 422) for rendering (operation 424). The content delivery service 328 might also store the static asset in a local cache (operation 426).

The foregoing discussions include techniques for managing the scaling of static asset containers, which techniques are disclosed in further detail as follows.

Figure 5:
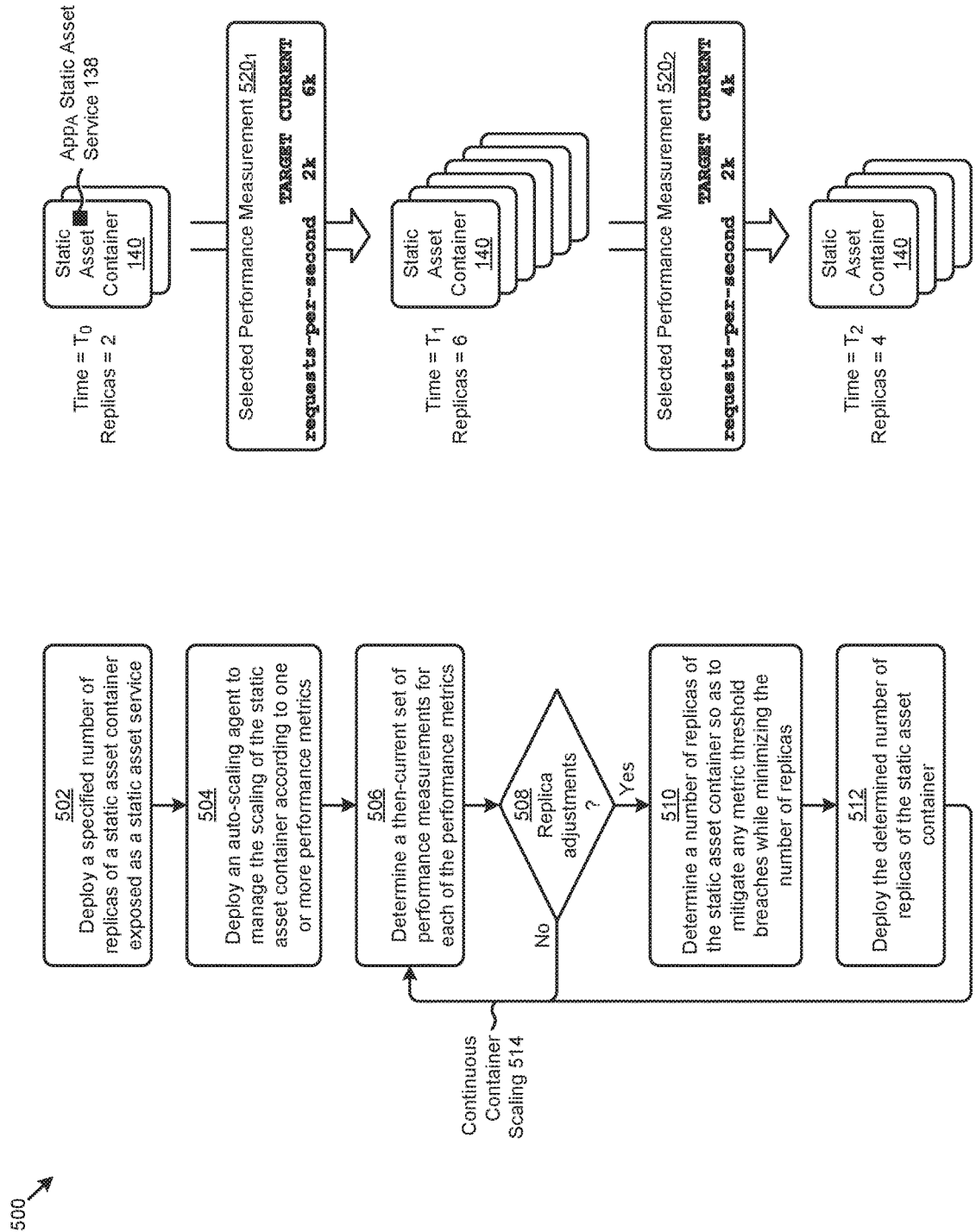
FIG. 5 depicts a static asset container management technique as implemented in systems that facilitate deploying static asset services as executable containers, according to an embodiment.

FIG. 5 depicts a static asset container management technique 500 as implemented in systems that facilitate deploying static asset services as executable containers. As an option, one or more variations of static asset container management technique 500 or any aspect thereof may be implemented in the context of the architecture and functionality of the embodiments described herein. The static asset container management technique 500 or any aspect thereof may be implemented in any environment.

FIG. 5 illustrates one aspect pertaining to deploying static assets of a web application as static asset containers that are exposed as a static asset service. Specifically, the figure is being presented to illustrate one embodiment of certain steps and/or operations for managing the scaling of static asset containers that are deployed according to the herein disclosed techniques.

The static asset container management technique 500 shown in FIG. 5 can commence by deploying a specified number of replicas of a static asset container that is exposed as a static asset service (step 502). As illustrated in the figure, two replicas of static asset container 140 that are exposed as $App_A$ static asset services might be deployed at time $T_0$. In certain cases, the initial number of replicas for a particular deployment of a static asset container might be specified in a set of container specifications (e.g., line 07 of Table 1).

According to the static asset container management technique 500, an auto-scaling agent is deployed to manage the scaling of the static asset container according to one or more performance metrics (step 504). In some cases, the auto-scaling agent is implemented in the static asset service and/or in the static asset container. In other cases, the auto-scaling agent might be implemented as an executable container in the same container environment (e.g., container management platform) as the static asset container. An example of a portion of a container specification for such an auto-scaling agent is presented in Table 2.

TABLE 2

Selected auto-scaling agent container specifications

| Line | Specification |
|---|---|
| 01 | apiVersion: autoscaling/v2beta1 |
| 02 | kind: ContainerAutoscaler |
| 03 | metadata: |
| 04 |     name: appA-static-assets |
| 05 |     namespace: appA-static-assets-dev |
| 06 | spec: |
| 07 |     scaleTargetRef: |
| 08 |         apiVersion: apps/v2beta1 |
| 09 |         kind: Deployment |
| 10 |         name: appA-static-assets |
| 11 |     minReplicas: 2 |
| 12 |     maxReplicas: 10 |
| 13 |     metrics: |
| 14 |         type: Resource |
| 15 |         resource: |
| 16 |             name: cpu |
| 17 |             targetAverageUtilization: 50 |
| 18 |         type: External |
| 19 |         external: |
| 20 |             name: requests-per-second |
| 21 |             targetvalue: 2k |

As can be observed, the shown container specifications indicate the auto-scaler will scale the static asset container based at least in part on the following constraints: a replica range of 2 to 10 replicas (e.g., lines 11-12), a CPU resource utilization metric with a target value of 50% (lines 14-17), and an external "requests-per-second" metric with a target value of 2000 (lines 18-21). Other resource metrics (e.g., metrics that correspond to resources used by a container management platform), pod metrics (e.g., metrics that correspond to a collection of containers in a container management platform), object metrics (e.g., metrics that correspond to non-pod objects in a container management platform), and/or external metrics (e.g., metrics that correspond to data provided externally to a container management platform) are possible.

The static asset container management technique 500 can further determine a then-current set of performance measurements for each of the performance metrics considered by the auto-scaling agent (step 506). If the then-current performance measurements indicate that an adjustment to the number of replicas is needed (see "Yes" path of decision 508), then a number of replicas of the static asset container is determined so as to mitigate any metric threshold breaches while minimizing the number of replicas (step 510). For example, the auto-scaling agent might examine each metric in turn to identify the maximum number of replicas needed to achieve all of the metric constraints specified in the auto-scaling agent specification. The determined number of replicas of the static asset container are then deployed (step 512). In some cases, deploying the determined number of replicas includes spawning new replicas while, in other cases, deploying the determined number of replicas includes killing existing replicas.

When the replicas are deployed or no replica adjustment is needed (see "No" path of decision 508), another set of then-current performance measurements is determined (step 506). As can be observed, the process of collecting measurements and/or adjusting the number of replicas results in continuous container scaling 514.

Such continuous container scaling of the static asset container 140 is illustrated in FIG. 5. Specifically, a selected performance measurement $520_1$ associated with the "requests-per-second" metric indicates a then-current measurement of 6,000 requests per second at time $T_0$, whereas the target limit for each container is 2,000 requests per second. As such, an auto-scaling agent such as described in static asset container management technique 500 will increase the number of replicas of the static asset container 140 to six replicas at time $T_1$. Continuing, a selected performance measurement $520_2$ at a time after $T_1$ indicates a then-current measurement of 4,000 requests per second, whereas the target limit for each container is, again, 2,000 requests per second. In this case, the auto-scaling agent will reduce the number of replicas of the static asset container 140 to four replicas at time $T_2$.

Additional Embodiments of the Disclosure

Additional Practical Application Examples

Figure 6:
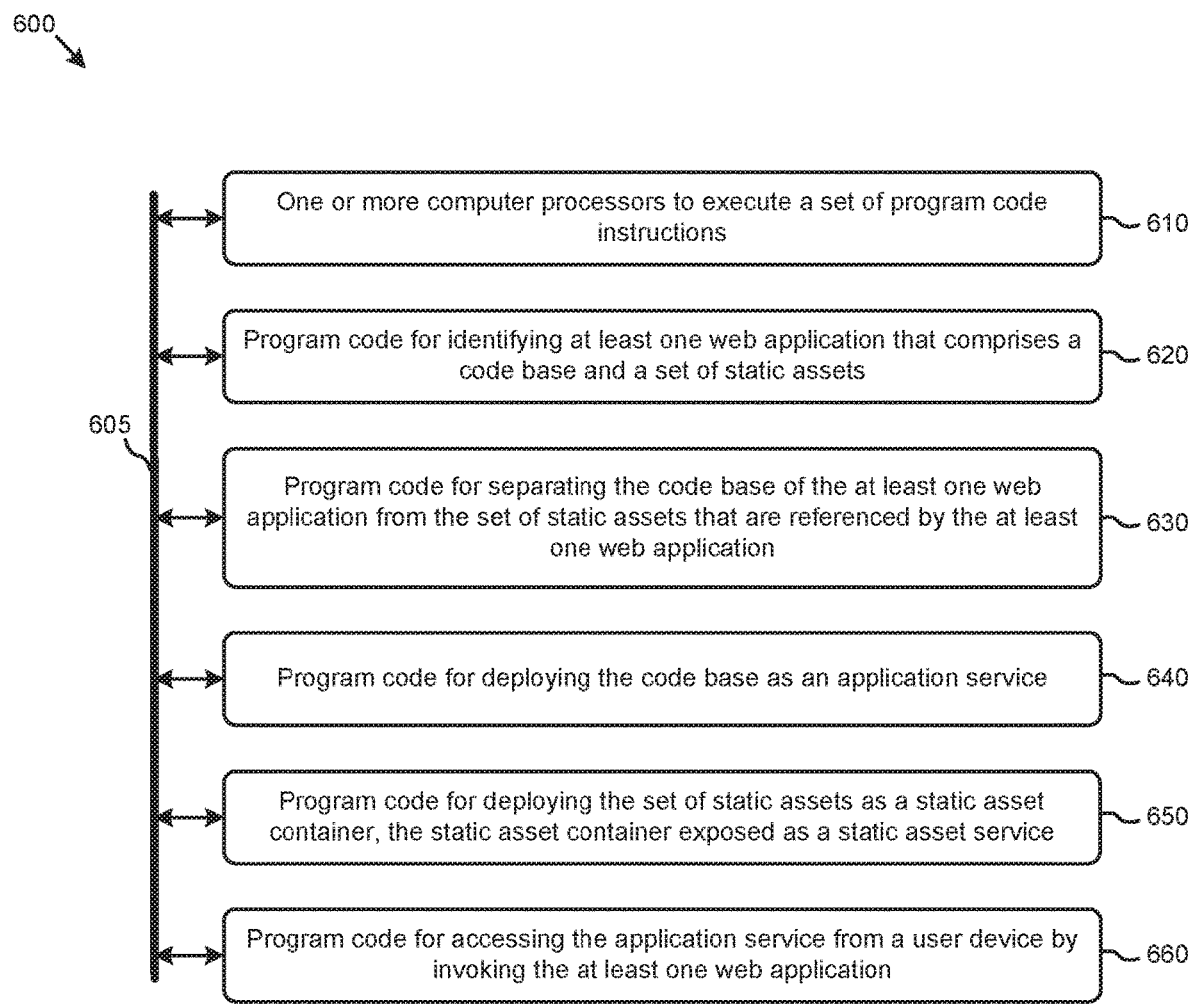
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. This and other embodiments present particular arrangements of elements that, individually and/or as combined, serve to form improved technological processes that address managing the static assets associated with large web applications. The partitioning of system 600 is merely illustrative and other partitions are possible. As an option, the system 600 may be implemented in the context of the architecture and functionality of the embodiments described herein. Of course, however, the system 600 or any operation therein may be carried out in any desired environment.

The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims.

The shown embodiment implements a portion of a computer system, presented as system 600, comprising one or more computer processors to execute a set of program code instructions (module 610) and modules for accessing memory to hold program code instructions to perform: identifying at least one web application that comprises a code base and a set of static assets (module 620); separating the code base of the at least one web application from the set of static assets that are referenced by the at least one web application (module 630); deploying the code base as an application service (module 640); deploying the set of static assets as a static asset container, the static asset container exposed as a static asset service (module 650); and accessing the application service from a user device by invoking the at least one web application (module 660).

Variations of the foregoing may include more or fewer of the shown modules. Certain variations may perform more or fewer (or different) steps and/or certain variations may use data elements in more or in fewer (or different) operations. Still further, some embodiments include variations in the operations performed, and some embodiments include variations of aspects of the data elements used in the operations.

System Architecture Overview

Additional System Architecture Examples

Figure 7A:
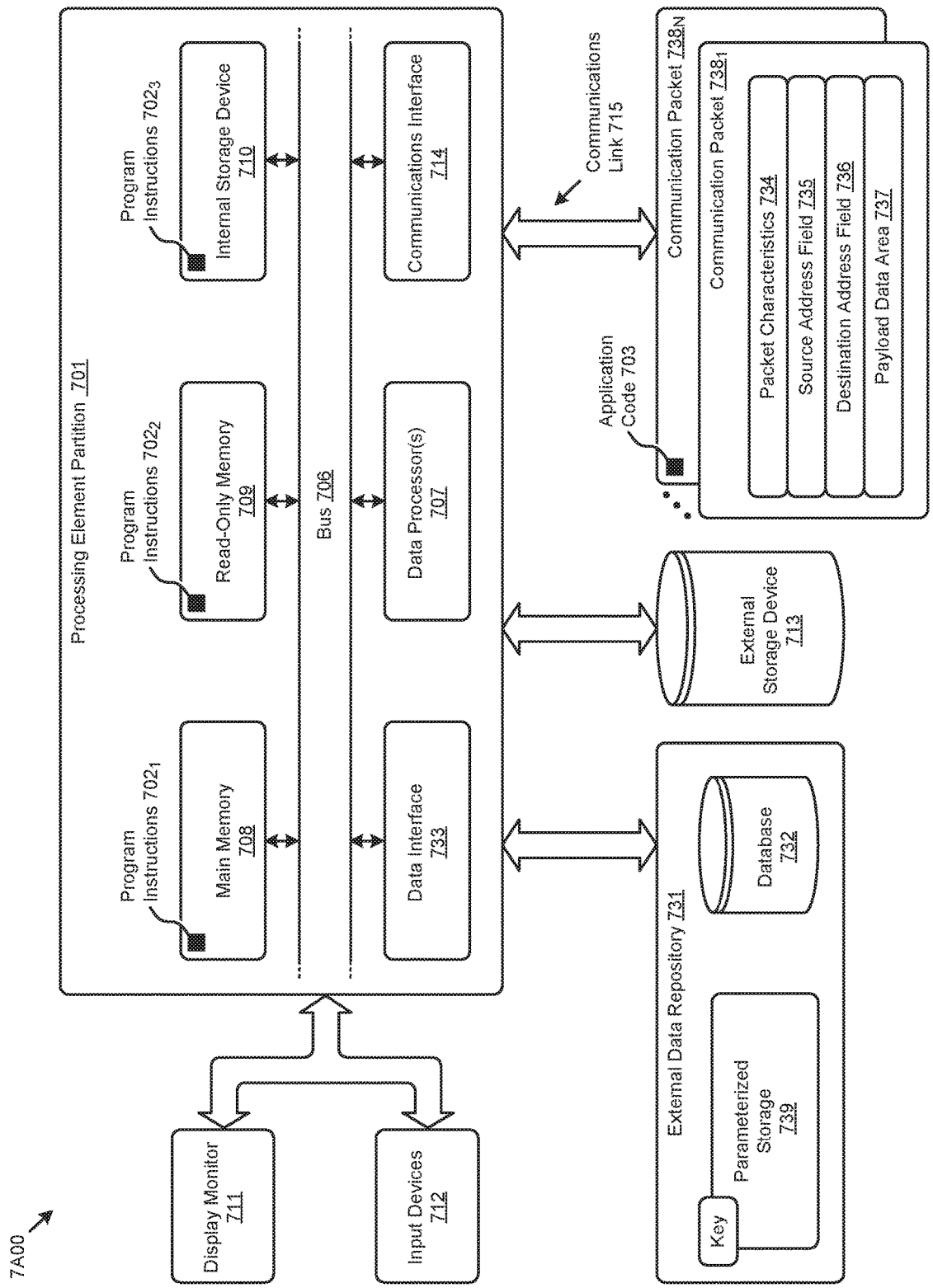
FIG. 7A and FIG. 7B present block diagrams of computer system architectures having components suitable for implementing embodiments of the present disclosure, and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. Computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of communications interface 714 may comprise one or more networking ports that are configurable (e.g., pertaining to speed, protocol, physical layer characteristics, media access characteristics, etc.) and any particular instance of communications interface 714 or port thereto can be configured differently from any other particular instance. Portions of a communication protocol can be carried out in whole or in part by any instance of communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

Communications link 715 can be configured to transmit (e.g., send, receive, signal, etc.) any types of communications packets (e.g., communication packet $738_1$, communication packet $738_N$) comprising any organization of data items. The data items can comprise a payload data area 737, a destination address 736 (e.g., a destination IP address), a source address 735 (e.g., a source IP address), and can include various encodings or formatting of bit fields to populate packet characteristics 734. In some cases, the packet characteristics include a version identifier, a packet or payload length, a traffic class, a flow label, etc. In some cases, payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of a computer system 7A00. According to certain embodiments of the disclosure, two or more instances of computer system 7A00 coupled by a communications link 715 (e.g., LAN, public switched telephone network, or wireless network) may perform the sequence of instructions required to practice embodiments of the disclosure using two or more instances of components of computer system 7A00.

Computer system 7A00 may transmit and receive messages such as data and/or instructions organized into a data structure (e.g., communications packets). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

Processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to deploying static asset services as executable containers. A module may include one or more state machines and/or combinational logic used to implement or facilitate the operational and/or performance characteristics pertaining to deploying static asset services as executable containers.

Various implementations of database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of deploying static asset services as executable containers). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to deploying static asset services as executable containers, and/or for improving the way data is manipulated when performing computerized operations pertaining to deploying static assets of a web application as static asset containers that are exposed as a static asset service.

Figure 7B:
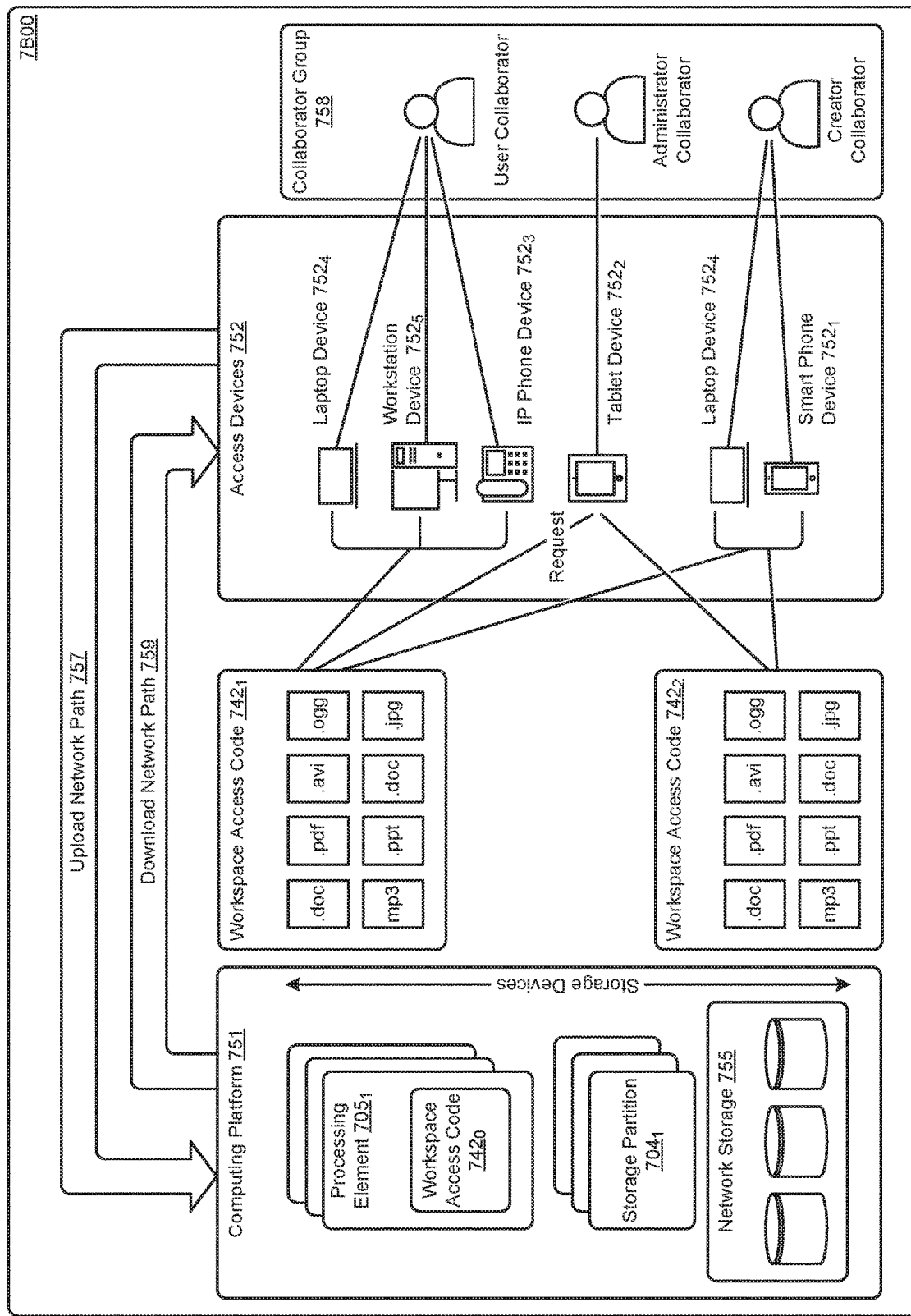

FIG. 7B depicts a block diagram of an instance of a cloud-based environment 7B00. Such a cloud-based environment supports access to workspaces through the execution of workspace access code (e.g., workspace access code $742_0$, workspace access code $742_1$, and workspace access code $742_2$). Workspace access code can be executed on any of access devices 752 (e.g., laptop device $752_4$, workstation device $752_5$, IP phone device $752_3$, tablet device $752_2$, smart phone device $752_1$, etc.). A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 751, including in a middleware setting. As shown, a portion of the workspace access code resides in and can be executed on one or more processing elements (e.g., processing element $705_1$). The workspace access code can interface with storage devices such as networked storage 755. Storage of workspaces and/or any constituent files or objects, and/or any other code or scripts or data can be stored in any one or more storage partitions (e.g., storage partition $704_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for managing static assets of web applications, the method comprising:
   identifying a web application that comprises a code base and a set of static assets that comprises digital contents for the web application and is separated from the code base; and
   deploying the code base and the set of static assets for the web application at least by:
      deploying a first number of replicas of a code base service instance for the code base; and
      dynamically scaling deployment of a second number of replicas of a static asset container that is exposed as a static asset service for the set of static assets, wherein the second number of replicas for the set of static assets is different from the first number of replicas for the code base;
   receiving a request from a client to access the web application; and
   servicing the request at least by provisioning the client with a first replica of the first number of replicas to access the code base for the web application and further by provisioning an asset call from the first replica to a second replica of the second number of replicas for the set of static assets to access the digital contents for the web application, wherein
      the second number of replicas is dynamically scaled based at least in part upon a usage or performance measurement pertaining to the web application and at least the asset call between the first and the second replica.

2. The method of claim 1, wherein the code base for the web application is not stored in a container and is deployed as the first number of replicas, each of which is exposed as the code base service instance.

3. The method of claim 1, further comprising associating a second replica of the second number of replicas of the static asset service instance with a first replica of the first number of replicas of the code base service instance by a portion of a URL (uniform resource locator) for a request from a client to access the web application.

4. The method of claim 3, wherein the asset call comprises a direct call from the client or an indirect call from the first replica of the code base service instance and is issued in response to the request from the client to access the web application.

5. The method of claim 1, further comprising:
   determining the second number of replicas of the static asset service instance based at least in part on one or more performance measurements that correspond to at least one of performance of one or more second service replicas of a static asset container or the static asset service instance; and
   deploying the second number of replicas of the static asset service instance.

6. The method of claim 5, wherein at least one of the one or more performance measurements correspond to at least one of a network traffic metric, a resource metric, a pod metric, an object metric, a replica range metric, a processor utilization metric, an external request per unit time metric, or an external metric.

7. The method of claim 1, further comprising scaling deployment of the first number of replicas of the code base service instance separately from dynamically scaling the deployment of the second number of replicas of the static asset service instance.

8. The method of claim 1, further comprising eliminating an unutilized static asset service instance from the second number of replicas of the static asset service instance of the set of static assets, wherein the unutilized static asset service instance is unutilized by the first number of replicas for the code base service instance of so that only replicas of the static asset service instance used by at least some of the first number of replicas of the code base service instance are deployed for the web application.

9. The method of claim 8, further comprising eliminating usage of storage resource at least by dynamically scaling the deployment of the second number of replicas of the static asset service instance to have a fewer number of replicas for the static asset service instance than the first number of replicas of the code base service instance, wherein the first number of replicas for the code base service instance is larger than the second number of replicas of the static asset service instance.

10. The method of claim 8, further comprising:
scaling the first number of replicas of the code base service instance at least by adding or removing one or more first replicas of the code base service instance of the code base; and
scaling the second number of replicas of the static asset service instance at least by adding or removing one or more second replicas of the static asset service instance, wherein scaling the first number of replicas of the code base service instance is performed independently of scaling the second number of replicas of static asset service instance to result in the first number for the code base being different from the second number for the set of static assets.

11. A non-transitory computer readable medium having stored thereon a sequence of instructions which, when stored in memory and executed by a processor, causes the processor to perform a set of acts for managing static assets of web applications, the set of acts comprising:
identifying a web application that comprises a code base and a set of static assets that comprises digital contents for the web application and is separated from the code base; and
deploying the code base and the set of static assets for the web application at least by:
deploying a first number of replicas of a code base service instance for the code base;
dynamically scaling deployment of a second number of replicas of a static asset container that is exposed as a static asset service for the set of static assets, wherein the second number of replicas for the set of static assets is different from the first number of replicas for the code base;
receiving a request from a client to access the web application; and
servicing the request at least by provisioning the client with a first replica of the first number of replicas to access the code base for the web application and further by provisioning an asset call from the first replica to a second replica of the second number of replicas for the set of static assets to access the digital content for the web application, wherein
the second number of replicas is dynamically scaled based at least in part upon a usage or performance measurement pertaining to the web application and at least the asset call between the first and the second replica.

12. The non-transitory computer readable medium of claim 11, further comprising instructions which, when stored in the memory and executed by processor, causes the processor to perform acts of:
associating a second replica of the second number of replicas of the static asset service instance with a first replica of the first number of replicas of the code base service instance by a portion of a URL (uniform resource locator) for a request from a client to access the web application.

13. The non-transitory computer readable medium of claim 12, the set of acts further comprising associating a second replica of the second number of replicas of the static asset service instance with a first replica of the first number of replicas of the code base service instance by a portion of a URL for a request from a client to access the web application.

14. The non-transitory computer readable medium of claim 11, further comprising instructions which, when stored in the memory and executed by the processor, causes the processor to perform acts of:
determining the second number of replicas of the static asset service instance based at least in part on one or more performance measurements that correspond at least one of performance of one or more second service replicas of a static asset container or the static asset service instance; and
deploying the second number of replicas of the static asset service instance.

15. The non-transitory computer readable medium of claim 14, the set of acts further comprising:
scaling the first number of replicas of the code base service instance at least by adding or removing one or more first replicas of the code base service instance of the code base; and
scaling the second number of replicas of the static asset service instance at least by adding or removing one or more second replicas of the static asset service instance, wherein scaling the first number of replicas of the code base service instance is performed independently of scaling the second number of replicas of static asset service instance to result in the first number for the code base being different from the second number for the set of static assets.

16. The non-transitory computer readable medium of claim 14, wherein the one or more performance measurements correspond to at least one of a network traffic metric, a resource metric, a pod metric, an object metric, a replica range metric, a processor utilization metric, an external request per unit time metric, or an external metric.

17. The non-transitory computer readable medium of claim 11, the set of acts further comprising eliminating an unutilized static asset service instance from the second number of replicas of the static asset service instance of the set of static assets, wherein the unutilized static asset service instance is unutilized by the first number of replicas for the code base service instance so that only replicas of the static asset service instance used by at least some of the first number of replicas of the code base service instance are deployed for the web application.

18. The non-transitory computer readable medium of claim 17, the set of acts further comprising eliminating usage of storage resource at least by dynamically scaling the deployment of the second number of replicas of the static asset service instance to have a fewer number of replicas for the static asset service instance than the first number of replicas of the code base service instance, wherein the first number of replicas for the code base service instance is larger than the second number of replicas of the static asset service instance.

19. A system for managing static assets of web applications, the system comprising:
a non-transitory storage medium having stored thereon a sequence of instructions; and
a processor that executes the sequence instructions, an execution of the sequence of instructions causing the one or more processors to perform a set of acts, the set of acts comprising,
identifying a web application that comprises a code base and a set of static assets that comprises digital contents for the web application and is separated from the code base; and
deploying the code base and the set of static assets for the web application at least by:

deploying a first number of replicas of a code base service instance for the code base; and dynamically scaling deployment of a second number of replicas of a static asset container that is exposed as a static asset service for the set of static assets, wherein the second number of replicas for the set of static assets is different from the first number of replicas for the code base;

receiving a request from a client to access the web application; and servicing the request at least by provisioning the client with a first replica of the first number of replicas to access the code base for the web application and further by provisioning an asset call from the first replica to a second replica of the second number of replicas for the set of static assets to access the digital content for the web application, wherein the second number of replicas is dynamically scaled based at least in part upon a usage or performance measurement pertaining to the web application and at least the asset call between the first and the second replica.

20. The system of claim 19, wherein the code base for the web application is not stored in a container and is deployed as the first number of replicas, each of which is exposed as the code base service instance.

* * * * *